(No Model.)
A. B. BISHOP.
FIFTH WHEEL FOR WAGONS.
No. 448,843. Patented Mar. 24, 1891.
Fig. I.
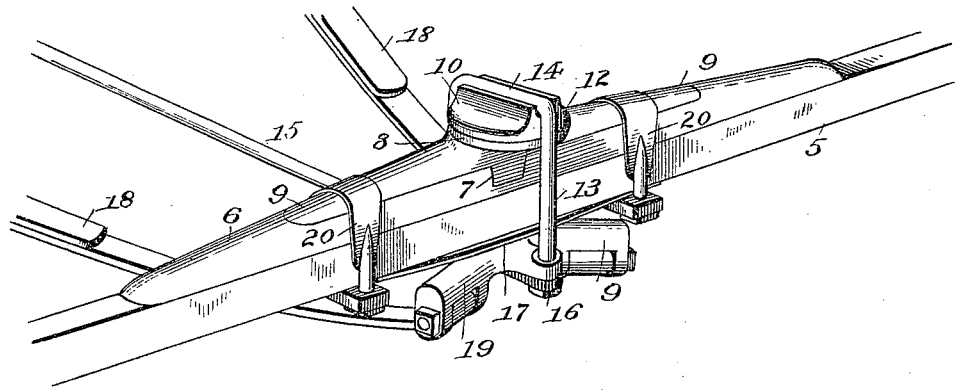
Fig. II.
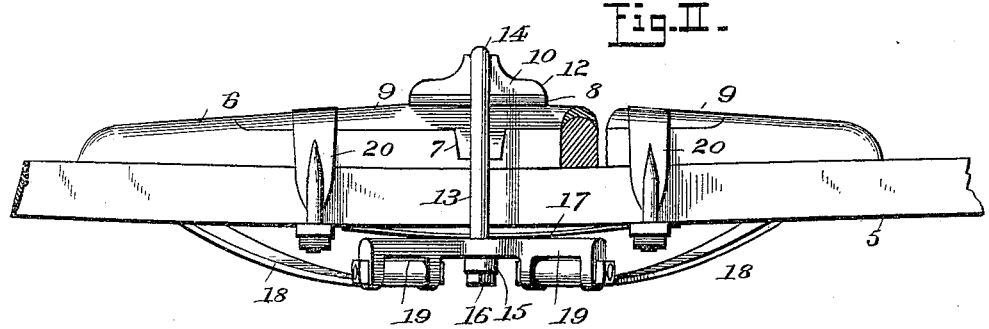
Fig. III.
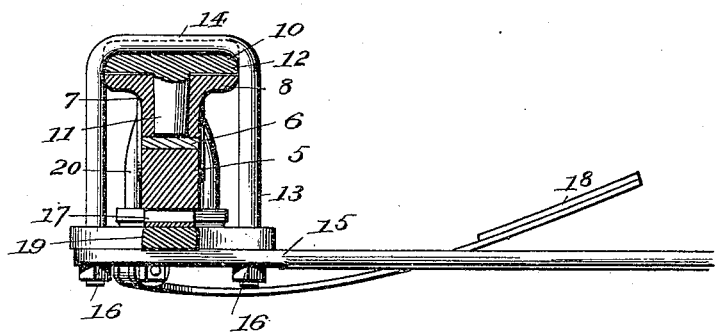
WITNESSES:
INVENTOR.
Abner B. Bishop.
W. B. Stevens, Atty.

UNITED STATES PATENT OFFICE.

ABNER B. BISHOP, OF MEDINA, OHIO.

FIFTH-WHEEL FOR WAGONS.

SPECIFICATION forming part of Letters Patent No. 448,843, dated March 24, 1891.

Application filed December 16, 1890. Serial No. 374,939. (No model.)

*To all whom it may concern:*

Be it known that I, ABNER B. BISHOP, a citizen of the United States, residing at Medina, in the county of Medina and State of Ohio, have invented certain new and useful Improvements in Fifth-Wheels for Wagons; and I do hereby declare the following to be a full, clear, and exact description of the invention, such as will enable others skilled in the art to which it appertains to make and use the same.

This invention relates to that portion of a wagon called the "fifth-wheel" and the attachments thereto; and its object is to provide means whereby the reach of a wagon or both the reach and side springs may be so connected with an axle as to permit the axle both to turn from side to side relative to the reach in the act of turning the wagon and at the same time to be always free to tilt one end higher than the other without tilting or twisting the reach in passing one wheel over an obstacle.

To this end my invention consists in the construction and combination of parts forming a fifth-wheel and connections therewith for wagons, hereinafter described and claimed, reference being had to the accompanying drawings, in which—

Figure I is a perspective view of a portion of wagon-gear, showing my invention. Fig. II is an enlarged front view of the fifth-wheel, and Fig. III is a longitudinal vertical section of the same.

5 represents the iron axle.

6 is the wooden stiffener or helve to the axle made with a central aperture to receive a wedge-shaped tightly-fitting lug 7, which projects downward from the lower metallic plate 8 of the fifth-wheel to serve as a stiffener to the helve and the axle by resisting the endwise compression of the grain of the upper side of the helve when its middle is forcibly pressed downward. 9 represents arms to the said plate, trough-shaped in their under sides and neatly curved up at their ends to fit upon the said helve when the latter is neatly rounded and to further aid in stiffening the helve.

10 may be termed the "king-bolt block," since it is provided with a conical pivot 11, which enters the plate 8 and does service as a king-bolt, though it does not require any hole through the axle or helve. At the same time it has a plate portion 12 to fit neatly upon the plate 8.

13 is a staple or inverted-U-shaped bolt having a cross portion 14 fitted to rock as a shaft transversely in a groove in the king-bolt plate 12, and two screw ends passing down through the reach 15 and held firmly therein by screw-nuts 16.

17 is a spring which is a characteristic feature of this invention. Its two ends bear up against the axle and its downward curved middle portion bears elastically against the reach. By this means the reach has a stirrup connection with the fifth-wheel, so that it may swing sidewise, slipping along on the spring whenever one end of the axle is much tilted, thus avoiding the twisting strain on the fifth-wheel connection usual to such tilting. This spring tends to restore the axle to a horizontal position; but it is sufficiently yielding to prevent any material twisting strain on the reach. A solid shoe, if curved downward in an arc concentric with the rock-shaft 14, would answer the purpose of the downward-curve spring to some extent.

18 represents two side springs to support the wagon-body hung at their rear ends to the axle in any usual manner, and hung at their forward ends upon lateral arms 19 of the reach itself, or of a head attached rigidly thereto.

It is usual to make fifth-wheels very broad to support the twisting strain; but my fifth-wheel is very narrow because there is no twisting strain brought to bear on it, and by connecting the side springs with the head of the reach I obtain the same stirrup connection therefore with the fifth-wheel, thus avoiding any twist on the body-supports by the tilting of the axles. The trough-shaped arms so engage the helve that when bound to the axle by clips 20, neither the helve nor the fifth-wheel can be twisted out of line on the axle.

As before described, the portion having the arms 19 may be integral with the reach 15, forming a head thereto, or it may be a separate plate held firmly to the head of the reach by the screw-bolts 13. In either case that portion may, for the purposes of the following claims, be called a portion of the reach.

Having thus fully described my invention, what I believe to be new, and desire to secure by Letters Patent, is the following:

1. The combination of a wagon-axle, a fifth-wheel having a grooved upper plate mounted thereon, a reach passing beneath the axle and connected with the said grooved plate by a hanging bolt or stirrup and a downward-curved piece from the axle bearing upon the reach, substantially as described.

2. The combination of a wagon-axle, a fifth-wheel thereon, a reach passing under the axle, stirrup-connection between the reach and fifth-wheel, and a spring between the reach and axle, substantially as described.

3. The combination of a fifth-wheel having a plate vertically bored as a bearing and mounted upon an axle, a king-bolt fitted to the said bore and terminating above the axle and provided with a cross-grooved plate to fit upon the plate first named, a reach having lateral arms at its forward end passing beneath the axle, a stirrup connecting the said reach and arms with the king-bolt, and springs hung at their forward ends upon the said arms, substantially as described, whereby the springs may be hung beneath the axle in connection with the fifth-wheel above the axle without the king-bolt penetrating the axle.

In testimony whereof I affix my signature in presence of two witnesses.

ABNER B. BISHOP.

Witnesses:
W. E. GRIESINGER,
W. H. HOBART.